United States Patent [19]

Takemoto et al.

[11] Patent Number: 5,560,771
[45] Date of Patent: Oct. 1, 1996

[54] COLOR INK COMPOSITION AND COLOR INK JET PRINTING METHOD

[75] Inventors: Kiyohiko Takemoto; Hiroyuki Onishi; Masaaki Itano; Yoshiyuki Koike; Etsuko Yoshiike; Miharu Yoshida; Hiroko Hayashi; Kazuhide Kubota, all of Suwa, Japan

[73] Assignee: Seiko Epson Corporation, Tokyo-to, Japan

[21] Appl. No.: 362,556

[22] PCT Filed: May 10, 1994

[86] PCT No.: PCT/JP94/00755

§ 371 Date: Mar. 29, 1995

§ 102(e) Date: Mar. 29, 1995

[87] PCT Pub. No.: WO94/26828

PCT Pub. Date: Nov. 24, 1994

[30] Foreign Application Priority Data

May 10, 1993 [JP] Japan ................... 5-107936
Oct. 20, 1993 [JP] Japan ................... 5-262674
Nov. 9, 1993 [JP] Japan ................... 5-279856
Dec. 16, 1993 [JP] Japan ................... 5-317068

[51] Int. Cl.$^6$ .................................. C09D 11/02
[52] U.S. Cl. ................... 106/22 R; 106/22 K; 106/20 D
[58] Field of Search ............... 106/22 R, 20 D, 106/22 K

[56] References Cited

U.S. PATENT DOCUMENTS

| 4,957,553 | 9/1990 | Koike et al. | 106/20 D |
| 5,075,699 | 12/1991 | Koike et al. | 347/100 |
| 5,108,504 | 4/1992 | Johnson et al. | 106/25 A |
| 5,261,953 | 11/1993 | Vieira et al. | 106/22 R |
| 5,395,434 | 3/1995 | Tochihara et al. | 106/22 R |

FOREIGN PATENT DOCUMENTS

| 0497522 | 8/1992 | European Pat. Off. . |
| 58-6752 | 2/1983 | Japan . |
| 58-222166 | 12/1983 | Japan . |
| 61-272276 | 12/1986 | Japan . |
| 63-139964 | 6/1988 | Japan . |
| 1-158083 | 6/1989 | Japan . |
| 4-183761 | 6/1992 | Japan . |

Primary Examiner—Helene Klemanski
Attorney, Agent, or Firm—Ladas & Parry

[57] ABSTRACT

A yellow ink composition, a magenta ink composition and cyan ink composition and a solvent system which are suitable for a color ink jet printing method are disclosed. These ink compositions can realize ideal color tones without limitation of properties of paper. Moreover, these ink compositions are excellent in intermittent jetting stability. The color ink jet printing method is also disclosed. In this method, ink compositions are overprinted to mix colors. Colors obtained by the color mixing have an ideal color tone.

26 Claims, No Drawings

COLOR INK COMPOSITION AND COLOR INK JET PRINTING METHOD

BACKGROUND OF THE INVENTION

1. Technical Field

The present invention relates to an ink composition for use in color ink jet printing and more particularly to a yellow ink composition, a magenta ink composition, a solvent system suitable for a color ink composition and a color ink jet printing method using said ink compositions.

2. Background Art

In the "color ink jet printing method" wherein a color image is formed using an ink jet printing method, it is a common technique to use at least a yellow ink, a magenta ink and a cyan ink.

In the color ink jet printing method, ink compositions for respective colors, as such, should first have a good color production property. In particular, it is preferred for a color to be faithfully produced even on plain paper, especially on acid paper.

Furthermore, there is a color ink jet printing method wherein, in addition to three colors (yellow, magenta and cyan), four colors of red, green, blue and black are formed by overprinting the three color ink compositions, i.e., a yellow ink, a magenta ink and a cyan ink, to effect seven colors printing. (Black may be formed by over-printing yellow, magenta and cyan, or alternatively, a black ink may be used.)

In this type of the color ink jet printing method, besides the good color production property of the ink compositions per se, it is important for the color ink compositions to produce faithful color tone of red, green and blue when mixed by overprinting. In general, an ink composition which has a good color production property when used alone cannot be expected to have a good color production property when mixed by overprinting. Furthermore, in many cases, even though a good colors can be realized on coated pater, a poor colors are produced on paper which has a high acidity. For this reason, there is a demand for ink compositions and combinations thereof that can realize the good color production when mixed by overprinting without limiting by properties of recording paper.

Furthermore, the color ink composition for ink jet printing should have properties commonly required for ink jet printing, such as cause neither clogging of nozzles nor a change in composition and properties during storage. In particular, after a printing is suspended for a certain period, it is desirable that the printing start without any troubles such as the deviation of the ink droplets from the ink path and the missing of dots. It is preferable that the "suspending period" that is a period by the time when the deviation of the ink droplets or the missing of dots is observed should be long. An ink composition which has a long "suspending period" is hereinafter referred as an ink composition excellent in intermittent jetting stability.

SUMMARY OF THE INVENTION

The present inventors have now obtained several findings on ink compositions that can satisfy various properties required as an ink composition for color ink jet printing. The present invention has been made based on these findings.

The object of the first aspect of the present invention is to provide a yellow ink composition having excellent color production property.

The object of the second aspect of the present invention is to provide a magenta ink composition having excellent color production property.

The object of the third aspect of the present invention is to provide a cyan ink composition having excellent color production property.

The object of the fourth aspect of the present invention is to provide a solvent system suitable for a color ink composition.

The object of the fifth aspect of the present invention is to provide a color ink jet printing method that can realize a good color printed image using the above ink compositions.

Accordingly, the yellow ink composition according to the first aspect of the present invention comprises C.I.Direct Yellow 86 and C.I. Direct Yellow 132 in a weight ratio of 1:3 to 3:1 and each in an amount of 0.3 to 3.0% by weight based on the ink composition.

The magenta ink composition according to the second aspect of the present invention comprises C.I. Acid Red 52 and C.I. Acid Red 289 in a weight ratio of 1:2 to 2:1 and each in an amount of 0.3 to 2.5% by weight based on the ink composition.

The cyan ink composition according to the third aspect of the present invention comprises 1 to 4% by weight of one or more dyes selected from a group consisting of C.I. Direct Blue 199, C.I. Direct Blue 86 and C.I. Acid Blue 9.

The color ink composition according to the fourth aspect of the present invention comprises at least water, a dye; a hydrophilic, high-boiling and low-volatile solvent; a polyhydric alcohol lower alkyl ether; and an acetylene glycol represented by the following formula (I):

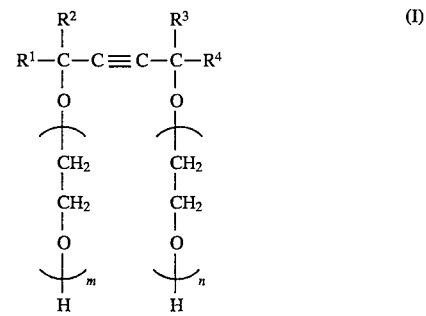

wherein $R^1$, $R^2$, $R^3$ and $R^4$ each independently represent a $C_{1-6}$ alkyl group and n+m is 0 to 30, the contents of the polyhydric alcohol lower alkyl ether and the acetylene glycol represented by the following formula (I) being 5 to 20% by weight and 0.1 to 3% by weight, respectively.

The color ink jet printing method according to the fifth aspect of the present invention is a color ink jet printing method using a yellow ink composition, a magenta ink composition and a cyan ink composition, wherein a yellow ink composition according to the first aspect of the present invention is employed as the yellow ink composition and a magenta ink composition according to the second aspect of the present invention is employed as the magenta ink composition.

DETAILED DESCRIPTION OF THE INVENTION

The yellow ink composition according to the first aspect of the present invention comprises as dyes C.I. Direct Yellow 86 and C.I. Direct yellow 132 in a weight ratio of 1:3 to 3:1, preferably 1:2 to 2:1, and each in an amount of 0.3 to 3.0% by weight, preferably 0.5 to 2.0% by weight, based on the ink composition. The yellow ink composition of the present invention can realize ideal yellow. In particular, ideal color tone can be provided on plain paper, especially plain acid paper. If the amounts of the two dyes added are outside the respective ranges specified above, the yellow color tone may become reddish or greenish even when the yellow ink composition is used alone, so that no ideal yellow can be produced. Furthermore, when mixed with other color ink compositions by overprinting, no good production of red and green can be provided. There is also a possibility that a large difference in color production occurs between plain neutral paper and plain acid paper. Moreover, clogging is likely to occur in the recording head at its ejection port.

The magenta ink composition according to the second aspect of the present invention comprises as dyes C.I. Acid Red 52 and C.I. Acid Red 289 in a weight ratio of 1:2 to 2:1, preferably 2:3 to 3:2, and each in an amount of 0.3 to 3.5% by weight, preferably 0.5 to 2.5% by weight, based on the ink composition. The magenta ink composition of the present invention can realize ideal magenta. In particular, ideal color tone can be provided on plain paper, especially plain acid paper. If the amounts of the two dyes added are outside the respective ranges specified above, the color tone may become bluish or reddish even when the magenta ink composition is used alone, so that no ideal magenta can be provided. Furthermore, when mixed with other color ink compositions by overprinting, no good production of green and blue can be provided. There is also a possibility that a large difference in color production occurs between plain neutral paper and plain acid paper. Moreover, clogging is likely to occur in the recording head at its ejection port.

Furthermore, the cyan ink composition according to the third aspect of the present invention comprises 1 to 4% by weight, preferably 1.5 to 3.5% by weight, of one or more dyes selected from a group consisting of C.I. Direct Blue 199, C.I. Direct Blue 86 and C.I. Acid Blue 9. The cyan ink composition of the present invention can realize ideal color tone on plain paper, especially plain acid paper.

There is no particular limitation on the solvent system for the yellow ink composition, the magenta ink composition and the cyan ink composition according to the present invention. However, it is preferred for the solvent system to contain an organic solvent and water capable of dissolving the dyes.

Specific preferred examples of the organic solvent include amides, such as dimethylformamide and dimethylacetamide; ketones and keto-alcohols, such as acetone and diacetone alcohol; ethers, such as tetrahydrofuran and dioxane; alkylene glycols having 2 to 6 carbon atoms in their alkylene group, such as ethylene glycol, propylene glycol, triethylene glycol and diethylene glycol; glycerin; polyalkylene glycols, such as polyethylene glycol and polypropylene glycol; polyhydric alcohol lower monoalkyl ethers, such as ethylene glycol monomethyl (or ethyl) ether, diethylene glycol monomethyl (or ethyl) ether and triethylene glycol monomethyl (or ethyl) ether; polyhydric alcohol lower dialkyl ethers, such as triethylene glycol dimethyl (or ethyl) ether; alkyl alcohols having 1 to 5 carbon atoms, such as methyl alcohol, ethyl alcohol, n-propyl alcohol and n-butyl alcohol; and other organic solvents, such as sulfolane, pyrrolidone, N-methyl-2-pyrrolidone, 1,3-dimethyl- 2-imidazolidinone and 1,5-pentanediol. These organic solvents may be used alone or in the form of a mixture of two or more of them.

Various additives may be added as the third component to the ink compositions for the purpose of improving various properties. For example, in order to adjust various properties, such as viscosity, surface tension, pH and specific resistance, or to prevent putrefaction and mildew, it is possible to add anionic surfactants, such as fatty acid salts, salts of alkylsulfates, alkylbenzenesulfonic acids and salts of alkylnaphthalenesulfonic acid; nonionic surfactants, such as acetylene glycols, polyoxyethylene alkyl ethers, polyoxyethylene alkylphenyl ethers, polyoxyethylene fatty acid esters and sorbitan fatty acid esters; water-soluble naturally occurring or synthetic polymers, such as celluloses, polyvinyl-pyrrolidone, polyvinyl alcohol and water-soluble resins; amines, such as diethanolamine and triethanolamine; and inorganic salts, such as lithium chloride, ammonium chloride and sodium chloride.

According to the fourth aspect of the present invention, there is provided an ink composition comprising a solvent system suitable for a color ink composition. According to a preferred embodiment of the present invention, an ink composition can be provided by a combination of the solvent system of the fourth aspect of the present invention with the yellow, magenta and cyan ink compositions of the first to third aspects of the present invention. The combination of the solvent system according to the present invention and the colorant system of ink compositions according to the first to third aspects of the present invention provides ink compositions excellent in intermittent jetting stability. Specifically, this combination provides an ink composition which has 20 or more seconds of the "suspending time". The use of an ink composition excellent in intermittent jetting stability has the advantage of reducing the number of flashing operation in which an ink composition is ejected from nozzles in a certain interval to keep properties of the ink composition the nozzles.

However, it is noted that the colorant used in the ink composition according to the fourth aspect of the present invention is not limited to those used in the ink compositions of the first to third aspects of the present invention and can be utilized in combination with a wide variety of colorants.

The ink composition according to the fourth aspect of the present invention contains a polyhydric alcohol lower alkyl ether. Specific preferred examples of the polyhydric alcohol lower alkyl ether include mono-, di- and triethylene glycol $C_{1-6}$ alkyl ether, mono-, di- and tripropylene glycol $C_{1-6}$ alkyl ether, and still preferred examples thereof include triethylene glycol monobutyl ether, diethylene glycol monobutyl ether, diethylene glycol monoethyl ether, diethylene glycol monomethyl ether and propylene glycol monobutyl ether. Triethylene glycol monobutyl ether is most preferred.

The amount of the polyhydric alcohol lower alkyl ether added is preferably in the range of from 7 to 12% by weight, still preferably in the range of from 7 to 10% by weight.

The ink composition according to the fourth aspect of the present invention further contains an acetylene glycol represented by the formula (I). Specific preferred examples of the acetylene glycol are as follows.

|  | $R^1$ | $R^2$ | $R^3$ | $R^4$ | n + m |
| --- | --- | --- | --- | --- | --- |
| No. 1 | iso-butyl | methyl | methyl | iso-butyl | 10 |
| No. 2 | iso-butyl | methyl | methyl | iso-butyl | 3.5 |
| No. 3 | ethyl | methyl | methyl | ethyl | 10 |
| No. 4 | methyl | methyl | methyl | methyl | 0 |
| No. 5 | ethyl | methyl | methyl | ethyl | 0 |
| No. 6 | iso-butyl | methyl | methyl | iso-butyl | 0 |

The acetylene glycol specified as No. 1 in the table is most preferred.

Some of acetylene glycols may be commercially available. For example, Surfynol 440, 465, 82 and TG (manufactured by Air Product and Chemicals, Inc. and sold by Shin-Etsu Chemical Co., Ltd.) may be employed.

The amount of the acetylene glycol added is preferably in the range of from 0.5 to 1.2% by weight, still preferably in the range of from 0.5 to 1% by weight.

A combination of the polyhydric alcohol lower alkyl ether and the acetylene glycol in respective amounts specified above can improve the quick drying property of the ink composition and prevent a deterioration in quality of print derived from, for example, bleeding, color mixing. Furthermore, the polyhydric alcohol lower alkyl ether alone sometimes corrodes the resin in the recording head or ink passages. However, the polyhydric alcohol lower alkyl ether in combination with the acetylene glycol can prevent such a corroding phenomenon. These effects can be further improved by adding a hydrophilic, high-boiling, low-volatile solvent, which will be described below, in an amount of not less than 50% by weight based on the polyhydric alcohol lower alkyl ether.

In the color printing, flow of dots and color mixing between adjacent dots reduce the quality of the resultant color image. Use of the polyhydric alcohol lower alkyl ether in combination with the acetylene glycol can prevent such color mixing, so that a color image having a high quality can be realized.

Examples of the coloring component of the ink usable in the present invention include direct dyes, acidic dyes, food dyes, basic dyes, reactive dyes, disperse dyes, vat dyes, soluble vat dyes, reactive disperse dyes and oil dyes. Water-soluble dyes are preferably used from the viewpoint of performance of the recording solution, and particularly preferred examples thereof include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247;

C.I. Direct Violet 7, 9, 47, 48, 51, 66, 90, 93, 94, 95, 98, 100 and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397;

C.I. Acid Violet 5, 34, 43, 47, 48, 90, 103 and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326;

C.I. Acid Black 7, 24, 29, 48, 52:1 and 172;

C.I. Reactive Red 3, 13, 17, 19, 21, 22, 23, 24, 29, 35, 37, 40, 41, 43, 45, 49 and 55;

C.I. Reactive Violet 1, 3, 4, 5, 6, 7, 8, 9, 16, 17, 22, 23, 24, 26, 27, 33 and 34;

C.I. Reactive Yellow 2, 3, 13, 14, 15, 17, 18, 23, 24, 25, 26, 27, 29, 35, 37, 41 and 42;

C.I. Reactive Blue 2, 3, 5, 8, 10, 13, 14, 15, 17, 18, 19, 21, 25, 26, 27, 28, 29 and 38;

C.I. Reactive Black 4, 5, 8, 14, 21, 23, 26, 31, 32 and 34;

C.I. Basic Red 12, 13, 14, 15, 18, 22, 23, 24, 25, 27, 29, 35, 36, 38, 39, 45 and 46;

C.I. Basic Violet 1, 2, 3, 7, 10, 15, 16, 20, 21, 25, 27, 28, 35, 37, 39, 40 and 48;

C.I. Basic Yellow 1, 2, 4, 11, 13, 14, 15, 19, 21, 23, 24, 25, 28, 29, 32, 36, 39 and 40;

C.I. Basic Blue 1, 3, 5, 7, 9, 22, 26, 41, 45, 46, 47, 54, 57, 60, 62, 65, 66, 69 and 71; and C.I. Basic Black 8.

The amount of these dyes added is determined depending upon, for example, the kind of dyes, the kind of the solvent component, the properties required of the ink. It is generally in the range of from 0.2 to 15% by weight, preferably in the range of from 0.5 to 10% by weight based on the total weight of the ink.

In the present invention, high-boiling, low-volatile, polyhydric alcohols, such as glycerin, ethylene glycol, diethylene, glycol, triethylene glycol, propylene glycol, dipropylene glycol, hexylene glycol, polyethylene glycol and polypropylene glycol, may be used as the hydrophilic, high-boiling, low-volatile solvent, and other water-soluble organic solvents including nitrogen-containing organic solvents, such as N-methyl-2-pyrrolidone, 1,3-dimethylimidazolidinone, monoethanolamine, N,N-dimethylethanolamine, N,N-diethylethanolamine, diethanolamine, N-n-butyldiethanolamine, triisopropanolamine and triethanolamine, may be added thereto in such an amount as will give rise to no bleeding in the print. Diethylene glycol and glycerin are especially preferred. These hydrophilic, high-boiling, low-volatile solvents are known to be added as a humectant for preventing clogging. The addition of the hydrophilic, high-boiling, low-volatile solvent as an essential component in the present invention also may play a role in alleviating the corrosion of the members. When volatile components, such as water, are evaporated within the head or the ink passage due to occurrence of an accident, such as malfunction of the printing device, the hydrophilic, high-boiling, low-volatile solvent alleviates the corrosion of the members by the polyhydric alcohol lower alkyl ether.

According to a preferred embodiment of the present invention, it is preferred for the ink composition to further comprise benzotriazole. The benzotriazole will preferably be present in the composition in an amount of 0.001 to 1.0% by weight. In a more preferred embodiment of the invention the amount of benzotriazole in the composition will be in the range of from 0.005 to 0.5% by weight. The addition of benzotriazole is advantageous for a printer system in which the ink composition is fed from the ink vessel to the recording head and an ink absorber is placed within the ink vessel so as for the ink composition to be held therein through absorption and impregnation into the ink absorber. Porous foams, such as urethane foam, have been generally used as the ink absorber to be placed within the ink vessel. From these absorbers, catalysts, foaming agents, foam stabilizers and other additives used during the production of porous foams are sometimes eluted into the ink composition. These eluted components are likely to cause a change in properties of the ink (for example, a high tendency for foaming or a change in contact angle). These components are also likely to change the properties of the ink passage or the surface of the nozzle, which is detrimental to jetting stability of ink droplets. These phenomena can be effectively prevented by adding benzotriazole to the ink composition.

The recording head in which the nozzle surface has been treated to have water repellent property is sometimes employed for stably jetting ink droplets. For example, eutectoid plating using a nickel-fluoropolymer is generally utilized for the water-repellent treatment (For example, the treatment according to the method described in EP-A-0506128 is preferably employed. This water-repellent treatment is obtained by electroplating an electroformed nickel plate having nozzles in a nickel plating solution in which polytetrafluoroethylene is dispersed in concentration of about 20%.) A deterioration in water repellency imparted by the water-repellent treatment may be accelerated by the polyhydric alcohol lower alkyl ether, acetylene glycol. Addition of benzotriazole is advantageous also in that the deterioration in the water repellency of the nozzle surface can be effectively prevented.

The ink jet printing method according to the fifth aspect of the present invention comprises effecting color ink jet printing using a combination of the yellow ink according to the first aspect of the present invention, the magenta ink according to the second aspect of the present invention and a specific cyan ink. In the present invention, although any color ink jet printing technique may be used, it is especially preferred to use a printing technique using seven colors in total wherein three color ink compositions of yellow, magenta and cyan are used, any two of the yellow ink, the magenta ink and the cyan ink are overprinted to form red, green and blue, and black is formed by overprinting the three colors or alternatively a black ink is used. The yellow ink and the magenta ink respectively according to the first and second aspects of the present invention and the cyan ink according to the third aspect of the present invention realize excellent ideal colors. Furthermore, overprinting of any two of these ink compositions can realize red, green and blue having nearly ideal color tones without depending on the properties of recording paper. Specifically, red provided by overprinting the yellow ink and the magenta ink, green provided by over printing the yellow ink and the cyan ink and blue provided by overprinting the magenta ink and the cyan ink can be produced in nearly ideal color tones on various kinds of recording paper, for example, plain recording paper having a high acidity. This means that good colors can be provided independently of the recording materials.

According to a preferred embodiment of the present invention, the amounts of yellow ink, magenta ink and cyan ink jetted through nozzles of a printing head as a droplet may be the same in the formation of red, green and blue. In general, in overprinting of the ink compositions, in theory, color tones of red, green and blue can be regulated by adjusting the amounts of the yellow, magenta and cyan ink compositions jetted through the nozzles. This technique, however, is complicated and disadvantageous from the practical point of view. Specifically, differentiation in the amount of the yellow ink jetted between the formation of red and formation of green is disadvantageous from the practical viewpoint. The present invention is advantageous, because red, green and blue can be produced in good color tones with the amounts of yellow, magenta and cyan inks jetted being kept constant.

Various properties of the ink compositions, especially the ink composition according to the fourth aspect of the present invention, are determined by the compositions of the inks and also can be properly determined by taking several requirements into consideration. For example, the surface tension is preferably 29 mN/m or more at the temperatures at which the composition are used for ink jet printing.

EXAMPLES

The present invention will now be described in more detail with reference to the following Examples, though it is not limited to these Examples only.

In the following Example, "%" is by weight.

Example A

The following yellow ink compositions were prepared.

Example A1

| | |
|---|---|
| C.I. Direct Yellow 86 | 0.3% |
| C.I. Direct Yellow 132 | 0.9% |
| (Weight ratio = 1:3) | |
| Glycerin | 5% |
| Water | Balance |

Example A2

| | |
|---|---|
| C.I. Direct Yellow 86 | 1% |
| C.I. Direct Yellow 132 | 2% |
| (Weight ratio = 1:2) | |
| Ethylene glycol | 10% |
| Surfynol 465 | 1% |
| Water | Balance |

Example A3

| | |
|---|---|
| C.I. Direct Yellow 86 | 1% |
| C.I. Direct Yellow 132 | 1% |
| (Weight ratio = 1:1) | |
| Glycerin | 5% |
| Ethylene glycol | 5% |
| Water | Balance |

Example A4

| | |
|---|---|
| C.I. Direct Yellow 86 | 2% |
| C.I. Direct Yellow 132 | 3% |
| (Weight ratio = 2:3) | |
| Glycerin | 5% |
| Diethylene glycol | 10% |
| Surfynol 465 | 1% |
| Water | Balance |

Example A5

| | |
|---|---|
| C.I. Direct Yellow 86 | 3% |
| C.I. Direct Yellow 132 | 1% |
| (Weight ratio = 3:1) | |
| Glycerin | 5% |
| Polyethylene glycol #200 | 5% |
| Water | Balance |

Comparative Example A1

| | |
|---|---|
| C.I. Direct Yellow 86 | 2% |
| Glycerin | 5% |
| Water | Balance |

Comparative Example A2

| | |
|---|---|
| C.I. Direct Yellow 132 | 2% |
| Diethylene glycol | 10% |
| Water | Balance |

Comparative Example A3

| | |
|---|---|
| C.I. Direct Yellow 86 | 0.2% |
| C.I. Direct Yellow 132 | 0.2% |
| Glycerin | 5% |
| Diethylene glycol | 5% |
| Surfynol 465 | 1% |
| Water | Balance |

Comparative Example A4

| | |
|---|---|
| C.I. Direct Yellow 86 | 4% |
| C.I. Direct Yellow 132 | 1% |
| Polyethylene glycol #200 | 10% |
| Water | Balance |

Comparative Example A5

| | |
|---|---|
| C.I. Direct Yellow 86 | 4% |
| C.I. Direct Yellow 132 | 4% |
| Glycerin | 5% |
| Ethylene glycol | 5% |
| Surfynol 465 | 1% |
| Water | Balance |

The ink compositions were prepared by mixing the above ingredients together, stirring the mixture at 60° C. for 2 hr to dissolve the ingredients and filtering the solution through a membrane filter having a diameter of 0.8 μm under a pressure of 2 kg/cm².

Evaluation Test A

The yellow ink compositions prepared in Examples A1 to A5 and Comparative Examples A1 to A5 were evaluated as follows.

Printing was performed using an experimental 48-nozzle ink jet printer under conditions of a jetting nozzle diameter of 30 μm, a piezoelectric element drive voltage of 80 V, a drive frequency of 3 kHz, a resolution of 360 dots/inch and an amount of ink jetted of 0.08 μg/dot.

Evaluation 1l: Color production (coated paper)

A 100%-duty print image (3×3 cm) was formed on an ink jet printing paper having a coat layer (IJ Mattcoat NM manufactured by Mitsubishi Paper Mills, Ltd.) using various yellow inks. With respect to the yellow color production, in the print image, the L*a*b* color specification system in the color difference indication method specified in CIE (Commission Internationale de l'Eclairage) was measured with a Macbeth CE-7000 spectrophotometer (manufactured by Macbeth), and the color difference between the measured value and the yellow color tone standard value (L*=90.7, a*=−18.8, b*=91.1) of ISO 2845-1975 was determined by the following equation (I):

$$\Delta E^*ab = [(\Delta L^*)^2 + (\Delta a^*)^2 + (\Delta b^*)^2]^{1/2} \quad (I)$$

The color differences were as given in Table 1. In the table, the color difference ΔE*ab was evaluated based on the following criteria:

Color difference E*ab:

Less than 5—good (o)

Not less than 5—poor (x)

Evaluation A2: Color production (plain paper, neutral paper and acid paper)

A 100%-duty print image was formed on the following plain paper (neutral paper and acid paper) as described in Evaluation A1.

Recording paper used for evaluation:

Xerox-R (neutral paper manufactured by Fuji Xerox Co., Ltd.)

Neenath bond (25% cotton fiber (acid paper) manufactured by Neenah bond)

Canon Dry (acid paper manufactured by Canon Sales Co., Ltd.)

EPP (acid paper manufactured by Seiko Epson Corporation)

Xerox 4024 3R721 (acid paper manufactured by Xerox)

Conqueror (100 g/m²) (neutral paper manufactured by Arjo Wiggin.)

The color tones of the solid printing was evaluated in the same manner as that of Evaluation A1, except that the color difference was determined based on printing image on Xerox-P paper. The color difference and the evaluation were as given in Table 1.

Evaluation A3: Jetting stability (clogging of nozzle)

Printing operation was carried out using each yellow ink composition to confirm that ink droplets were projected from all the nozzles. Thereafter, the printer was allowed to stand in a temperature environment of 40° C. without cap-ping the recording head. After one month, the printing operation was resumed to observe the printing state.

Normal printing could be carried out immediately after resumption or after cleaning operation was repeated 3 times or less—good (o);

Normal printing could be carried out after cleaning operation was repeated 4 to 10 times—slightly poor (Δ); and Normal printing could be carried out after cleaning operation was repeated not less than 11 times, or no normal printing could be carried out even after repeated cleaning operation—poor (X).

TABLE 1

|  |  | Example |  |  |  |  | Comparative Example |  |  |  |  |
|---|---|---|---|---|---|---|---|---|---|---|---|
|  |  | A1 | A2 | A3 | A4 | A5 | A1 | A2 | A3 | A4 | A5 |
| Evaluation A1 |  | ΔE*ab | 3.0 | 2.0 | 1.0 | 1.5 | 4.5 | 9.0 | 7.0 | 7.5 | 8.5 | 6.5 |
|  |  | Evaluation | ○ | ○ | ○ | ○ | ○ | X | X | X | X | X |
| Evaluation A2 | Xerox-P |  | Control | Control | Control | Control | Control | Control | Control | Control | Control | Control |
|  | Neenah Bond | ΔE*ab | 1.8 | 1.3 | 1.0 | 1.5 | 2.2 | 2.1 | 1.8 | 1.7 | 2.0 | 1.9 |
|  |  | Evaluation | ○ | ○ | ○ | ○ | ○ | ○ | ○ | ○ | ○ | ○ |
|  | Canon Dry | ΔE*ab | 3.1 | 2.4 | 2.2 | 2.9 | 3.4 | 8.3 | 7.9 | 6.3 | 7.7 | 6.8 |
|  |  | Evaluation | ○ | ○ | ○ | ○ | ○ | X | X | X | X | X |
|  | EPP | ΔE*ab | 3.5 | 2.8 | 2.5 | 3.1 | 3.9 | 9.2 | 8.4 | 6.9 | 8.1 | 7.2 |
|  |  | Evaluation | ○ | ○ | ○ | ○ | ○ | X | X | X | X | X |
|  | Xerox 4024 3R721 | ΔE*ab | 2.3 | 1.7 | 1.3 | 1.9 | 2.5 | 2.2 | 2.0 | 1.9 | 2.1 | 2.0 |
|  |  | Evaluation | ○ | ○ | ○ | ○ | ○ | ○ | ○ | ○ | ○ | ○ |
| Evaluation A3 |  | Evaluation | ○ | ○ | ○ | ○ | ○ | Δ | Δ | ○ | X | X |

Example B

The following magenta ink compositions were prepared.

Example B1

| C.I. Acid Red 52 | 0.3% |
|---|---|
| C.I. Acid Red 289 | 0.6% |
| Diethylene glycol | 20% |
| Proxel XL2 (Preservative manufactured by ZENECA) | 0.5% |
| Water | Balance |

Example B2

| C.I. Acid Red 52 | 1% |
|---|---|
| C.I. Acid Red 289 | 2% |
| Diethylene glycol | 10% |
| Glycerin | 13% |
| Proxel XL2 | 0.5% |
| Water | Balance |

Example B3

| C.I. Acid Red 52 | 1% |
|---|---|
| C.I. Acid Red 289 | 1% |
| Diethylene glycol | 15% |
| Surfynol 465 | 1% |
| Proxel XL2 | 0.5% |
| Water | Balance |

Example B4

| C.I. Acid Red 52 | 2.5% |
|---|---|
| C.I. Acid Red 289 | 1.3% |
| Glycerin | 15% |
| Polyethylene glycol (#200) | 10% |
| Proxel XL2 | 0.5% |
| Water | Balance |

Example B5

| C.I. Acid Red 52 | 0.9% |
|---|---|
| C.I. Acid Red 289 | 0.6% |
| Diethylene glycol | 15% |
| Triethylene glycol monobutyl ether | 10% |
| Proxel XL2 | 0.3% |
| Water | balance |

Example B6

| C.I. Acid Red 52 | 0.9% |
|---|---|
| C.I. Acid Red 289 | 0.7% |
| Glycerin | 10% |
| Triethylene glycol | 10% |
| Surfynol 465 | 1.5% |
| Proxel XL2 | 0.3% |
| Water | Balance |

Example B7

| C.I. Acid Red 52 | 1.2% |
|---|---|
| C.I. Acid Red 289 | 0.8% |
| Glycerin | 10% |
| Diethylene glycol | 5% |
| Triethylene glycol monobutyl ether | 10% |
| Proxel XL2 | 0.5% |
| Water | Balance |

Example B8

| C.I. Acid Red 52 | 0.7% |
|---|---|
| C.I. Acid Red 289 | 0.7% |
| Glycerin | 15% |
| Polyethylene glycol (#200) | 10% |
| Proxel XL2 | 0.3% |
| Water | Balance |

Comparative Example B1

| C.I. Acid Red 52 | 2% |
|---|---|
| Glycerin | 15% |
| Proxel XL2 | 0.5% |
| Water | Balance |

Comparative Example B2

| | |
|---|---|
| C.I. Acid Red 289 | 2% |
| Diethylene glycol | 20% |
| Proxel XL2 | 0.3% |
| Water | Balance |

Comparative Example B3

| | |
|---|---|
| C.I. Acid Red 52 | 0.2% |
| C.I. Acid Red 289 | 0.2% |
| Glycerin | 10% |
| Diethylene glycol | 15% |
| Proxel XL2 | 0.5% |
| Water | Balance |

Comparative Example B4

| | |
|---|---|
| C.I. Acid Red 52 | 0.5% |
| C.I. Acid Red 289 | 2% |
| Glycerin | 10% |
| Polytriethylene glycol (#200) | 15% |
| Proxel XL2 | 0.5% |
| Water | Balance |

Comparative Example B5

| | |
|---|---|
| C.I. Acid Red 52 | 3% |
| C.I. Acid Red 289 | 3% |
| Glycerin | 10% |
| Triethylene glycol | 15% |
| Proxel XL2 | 0.3% |
| Water | Balance |

The ink compositions were prepared by mixing the above ingredients together, stirring the mixture at 70° C. for 2 hr to dissolve the ingredients and filtering the solution through a membrane filter having a diameter of 0.8 µm under a pressure of 2 kg/cm².

Evaluation Test B

The magenta ink compositions prepared in Examples B1 to B5 and Comparative Examples B1 to B5 were evaluated as follows.

Printing was carried out using an experimental 48-nozzle ink jet printer under conditions of a jetting nozzle diameter of 30 µm, a piezoelectric element drive voltage of 25 V, a drive frequency of 5 kHz, a resolution of 360 dots/inch and an amount of ink jetted of 0.05 µg/dot.

Evaluation B1: Color production

A 100%-duty print image (3×3 cm) was formed on the following plain paper using each magenta ink composition.

Recording paper used for evaluation:

Neenah Bond (acid paper manufactured by Kimberly-Clark)

Xerox-P (neutral paper manufactured by Fuji Xerox Co., Ltd.)

Canon Dry (acid paper manufactured by Canon Sales Co., Ltd.)

Yamayuri (acid paper manufactured by Honshu Paper Co., Ltd.)

Ricopy 6200 (acid paper manufactured by Ricoh Co., Ltd.)

EPP (acid paper manufactured by Seiko Epson Corporation)

Xerox R (acid paper manufactured by Fuji Xerox Co., Ltd.)

Xerox 4024 3R721 (acid paper manufactured by Xerox Co.)

Conqueror (100 g/m²) (neutral paper manufactured by Arjo Wigging)

Rapid Copy (neutral paper manufactured by Igepa Plus)

Mode White Copy 80 (neutral paper manufactured by Modo)

The color production of the solid prints was evaluated in terms of the color difference between the measured value and the magenta color tone standard value (L*=48.4, a*=78.1, b*=−7.1) specified in ISO 2845-1975 in the same manner as that of the evaluation A1.

The resultant color differences were as given in Table 2. In the table, the color difference ΔE*ab was evaluated based on the following criteria.

ΔE*ab was less than 2 for all the types of recording paper—excellent (⊚);

ΔE*ab was in the range of from 2 to less than 3 for at least one type of recording paper, or the average ΔE*ab value of the measured values for all the types of recording paper was in the range of from 2 to less than 3—good (o); and ΔE*ab was 3 or more for at least one type of recording paper, or the average ΔE*ab value of the measured values for all the types of recording paper was 3 or more—poor (X).

Evaluation B2

Several solid prints prepared in Evaluation B1 were evaluated in the same manner as that of Evaluation B1, except that the color difference was determined based on a print on xerox-P paper. The color difference and the evaluation were as given in Table 2.

Evaluation B3: Jetting stability (clogging of nozzle)

Each magenta ink composition was evaluated on the jetting stability in the same manner as that of Evaluation A3.

The results were as given in Table 2.

Evaluation B4: Jetting stability (long-term continuous recording)

Printing was carried out continuously for 48 hr using each magenta ink composition under temperature environments of 5° C., 20° C. and 40° C. The printing state was evaluated as follows:

No dropout of dots was observed at all the temperatures with stable printing—good (o);

Dropout of dots was observed with elapse of time at any one of the temperatures—slightly poor (Δ); and Dropout of dots was observed from early stage of printing at any one of the temperatures—poor (X).

TABLE 2

|  |  |  | Example | | | | | | | | Comparative Example | | | | |
|---|---|---|---|---|---|---|---|---|---|---|---|---|---|---|---|
|  |  |  | 1 | 2 | 3 | 4 | 5 | 6 | 7 | 8 | 1 | 2 | 3 | 4 | 5 |
| Evaluation B1 | Average | ΔE*ab | 2.8 | 2.4 | 1.0 | 2.1 | 1.2 | 1.1 | 1.1 | 1.2 | 6.1 | 6.8 | 5.0 | 4.2 | 3.8 |
|  |  | Evaluation | ○ | ○ | ⊙ | ○ | ⊙ | ⊙ | ⊙ | ⊙ | X | X | X | X | X |
| Evaluation B2 | Xerox-P |  | Control | Control | Control | Control | Control | Control | Control | Control | Control | Control | Control | Control | Control |
|  | Neenah Bond | ΔE*ab | 1.0 | 0.8 | 0.4 | 0.6 | 0.3 | 0.4 | 0.5 | 0.3 | 2.7 | 2.8 | 2.1 | 2.3 | 2.2 |
|  |  | Evaluation | ⊙ | ⊙ | ⊙ | ⊙ | ⊙ | ⊙ | ⊙ | ⊙ | ○ | ○ | ○ | ○ | ○ |
|  | Canon Dry | ΔE*ab | 2.0 | 1.5 | 0.7 | 1.0 | 0.6 | 0.7 | 0.8 | 0.5 | 4.4 | 4.9 | 3.5 | 3.8 | 3.2 |
|  |  | Evaluation | ○ | ⊙ | ⊙ | ⊙ | ⊙ | ⊙ | ⊙ | ⊙ | X | X | X | X | X |
|  | Yamayuri | ΔE*ab | 2.2 | 2.0 | 0.9 | 1.2 | 0.8 | 0.7 | 0.7 | 0.6 | 5.1 | 5.5 | 3.8 | 4.3 | 3.4 |
|  |  | Evaluation | ○ | ○ | ⊙ | ⊙ | ⊙ | ⊙ | ⊙ | ⊙ | X | X | X | X | X |
|  | Xerox 4024 3R721 | ΔE*ab | 1.2 | 0.9 | 0.6 | 0.8 | 0.5 | 0.7 | 0.6 | 0.4 | 4.3 | 4.6 | 3.4 | 3.7 | 3.1 |
|  |  | Evaluation | ⊙ | ⊙ | ⊙ | ⊙ | ⊙ | ⊙ | ⊙ | ⊙ | X | X | X | X | X |
| Evaluation B3 |  | Evaluation | ○ | ○ | ○ | ○ | ○ | ○ | ○ | ○ | Δ | Δ | ○ | Δ | X |
| Evaluation B4 |  | Evaluation | ○ | ○ | ○ | ○ | ○ | ○ | ○ | ○ | Δ | Δ | ○ | Δ | X |

Example C

Combinations of color ink compositions comprising a black ink, a yellow ink, a magenta ink and a cyan ink (Examples C1 to C12) as specified in Table 3 and combinations of color ink compositions (Comparative Examples C1 to C8) as specified in Table 4 were provided.

In the tables, B, Y, M and C respectively represent black, yellow, magenta and cyan ink compositions, TEG-mBE represents triethylene glycol monobutyl ether, and DEG-mBE represents diethylene glycol monobutyl ether.

The resultant ink compositions were subjected to measurement of surface tension. The measured values were as given in the tables.

TABLE 3

|  | Example C1 | | | | Example C2 | | | | Example C3 | | | |
|---|---|---|---|---|---|---|---|---|---|---|---|---|
| [wt %] | B | Y | M | C | B | Y | M | C | B | Y | M | C |
| C.I. Direct Black 154 | 5 |  |  |  | 5 |  |  |  |  |  |  |  |
| C.I. Direct Black 9 |  |  |  |  |  |  |  |  | 4 |  |  |  |
| C.I. Acid Black 24 |  |  |  |  |  |  |  |  |  |  |  |  |
| C.I. Direct Yellow 132 |  | 2 |  |  |  | 0.75 |  |  |  |  |  |  |
| C.I. Direct Yellow 86 |  |  |  |  |  | 1 |  |  |  | 1.75 |  |  |
| C.I. Acid Yellow 42 |  |  |  |  |  |  |  |  |  |  |  |  |
| C.I. Acid Red 289 |  |  | 2 |  |  |  | 1 |  |  |  |  |  |
| C.I. Acid Red 52 |  |  |  |  |  |  | 1 |  |  |  | 2 |  |
| C.I. Direct Red 184 |  |  |  |  |  |  |  |  |  |  |  |  |
| C.I. Direct Blue 199 |  |  |  | 3.5 |  |  |  | 3.5 |  |  |  |  |
| C.I. Direct Blue 86 |  |  |  |  |  |  |  |  |  |  |  | 3 |
| C.I. Acid Blue 9 |  |  |  |  |  |  |  |  |  |  |  |  |
| TEG-mBE | 10 | 10 | 10 | 10 | 10 | 10 | 10 | 10 | 10 | 10 | 10 | 10 |
| DEG-mBE |  |  |  |  |  |  |  |  |  |  |  |  |
| Surfynol 465 | 0.5 | 0.5 | 0.5 | 0.5 | 0.8 | 0.8 | 0.8 | 0.8 | 1 | 1 | 1 | 1 |
| Diethylene glycol | 8 | 18 | 19 | 15 | 5 | 16 | 17 | 17 | 10 | 15 | 15 | 16 |
| Glycerin |  |  |  |  |  |  |  |  |  |  |  |  |
| Proxel XL-2 | 0.3 | 0.3 | 0.3 | 0.3 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 | 0.005 | 0.005 | 0.005 | 0.005 |
| Ultrapure water | 76.195 | 69.195 | 68.195 | 70.695 | 78.895 | 71.145 | 69.895 | 72.395 | 74.695 | 71.945 | 71.695 | 69.695 |
| Surface tension [mN/m] | 31.0 | 31.9 | 31.5 | 30.4 | 30.4 | 31.3 | 31.0 | 30.1 | 30.0 | 30.8 | 30.6 | 29.5 |

|  | Example C4 | | | | Example C5 | | | | Example C6 | | | |
|---|---|---|---|---|---|---|---|---|---|---|---|---|
| [wt %] | B | Y | M | C | B | Y | M | C | B | Y | M | C |
| C.I. Direct Black 154 |  |  |  |  |  |  |  |  | 5 |  |  |  |
| C.I. Direct Black 9 | 4 |  |  |  |  |  |  |  |  |  |  |  |

TABLE 3-continued

| | C.I. Acid Black 24 | 4 | | | | | | | | | | | |
|---|---|---|---|---|---|---|---|---|---|---|---|---|---|

(continuation of previous table)

| | B | Y | M | C | B | Y | M | C | B | Y | M | C |
|---|---|---|---|---|---|---|---|---|---|---|---|---|
| C.I. Acid Black 24 | 4 | | | | | | | | | | | |
| C.I. Direct Yellow 132 | | | | | | 2 | | | | 0.75 | | |
| C.I. Direct Yellow 86 | | | | | | | | | | 1 | | |
| C.I. Acid Yellow 42 | | 2 | | | | | | | | | | |
| C.I. Acid Red 289 | | | | | | | | | | | 1 | |
| C.I. Acid Red 52 | | | | | | | 2 | | | | | |
| C.I. Direct Red 184 | | | 1.75 | | | | | | | | | |
| C.I. Direct Blue 199 | | | | | | | | 3 | | | | 3.5 |
| C.I. Direct Blue 86 | | | | | | | | | | | | |
| C.I. Acid Blue 9 | | | | 3.5 | | | | | | | | |
| TEG-mBE | 8.5 | 8.5 | 8.5 | 8.5 | 8.5 | 8.5 | 8.5 | 8.5 | 8.5 | 8.5 | 8.5 | 8.5 |
| DEG-mBE | | | | | | | | | | | | |
| Surfynol 465 | 0.5 | 0.5 | 0.5 | 0.5 | 0.8 | 0.8 | 0.8 | 0.8 | 1 | 1 | 1 | 1 |
| Diethylene glycol | 7 | 10 | 11 | 12 | | | | | 8 | 10 | 12 | 14 |
| Glycerin | | | | | 5 | 12 | 10 | 11 | | | | |
| Proxel XL-2 | 0.3 | 0.3 | 0.3 | 0.3 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 | 0.005 | 0.005 | 0.005 | 0.005 |
| Ultrapure water | 79.695 | 78.695 | 77.945 | 75.195 | 81.359 | 76.395 | 78.395 | 76.395 | 77.195 | 78.445 | 76.195 | 72.695 |
| Surface tension [mN/m] | 31.1 | 32.0 | 31.6 | 30.5 | 30.5 | 31.4 | 31.0 | 30.2 | 30.1 | 30.9 | 30.7 | 29.7 |

| | Example C7 | | | | Example C8 | | | | Example C9 | | | |
|---|---|---|---|---|---|---|---|---|---|---|---|---|
| [wt %] | B | Y | M | C | B | Y | M | C | B | Y | M | C |
| C.I. Direct Black 154 | 154 | | | | 5 | | | | 5 | | | |
| C.I. Direct Black 9 | | | | | | | | | | | | |
| C.I. Acid Black 24 | 4 | | | | | | | | | | | |
| C.I. Direct Yellow 132 | | | | | | | | | | 0.75 | | |
| C.I. Direct Yellow 86 | | | | | | 2 | | | | 1 | | |
| C.I. Acid Yellow 42 | | 2 | | | | | | | | | | |
| C.I. Acid Red 289 | | | | | | | 2 | | | | 1 | |
| C.I. Acid Red 52 | | | | | | | | | | | 1 | |
| C.I. Direct Red 184 | | | 1.75 | | | | | | | | | |
| C.I. Direct Blue 199 | | | | | | | | | | | | 3.5 |
| C.I. Direct Blue 86 | | | | | | | | 3 | | | | |
| C.I. Acid Blue 9 | | | | 2.5 | | | | | | | | |
| TEG-mBE | 7 | 7 | 7 | 7 | 7 | 7 | 7 | 7 | 7 | 7 | 7 | 7 |
| DEG-mBE | | | | | | | | | | | | |
| Surfynol 465 | 0.5 | 0.5 | 0.5 | 0.5 | 0.8 | 0.8 | 0.8 | 0.8 | 1 | 1 | 1 | 1 |
| Diethylene glycol | | | | | 8 | 10 | 12 | 14 | 10 | 18 | 20 | 16 |
| Glycerin | 8 | 10 | 9 | 10 | | | | | | | | |
| Proxel XL-2 | 0.3 | 0.3 | 0.3 | 0.3 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 | 0.005 | 0.005 | 0.005 | 0.005 |
| Ultrapure water | 80.195 | 80.195 | 81.445 | 79.695 | 78.895 | 79.895 | 77.895 | 74.895 | 76.695 | 71.945 | 69.695 | 72.195 |
| Surface tension [mN/m] | 31.2 | 32.1 | 31.7 | 30.7 | 30.6 | 31.5 | 31.3 | 30.3 | 30.2 | 31.0 | 30.9 | 29.9 |

| | Example C10 | | | | Example C11 | | | | Example C12 | | | |
|---|---|---|---|---|---|---|---|---|---|---|---|---|
| [wt %] | B | Y | M | C | B | Y | M | C | B | Y | M | C |
| C.I. Direct Black 154 | 154 | 5 | | | | | | | | | | |
| C.I. Direct Black 9 | | | | | 4 | | | | | | | |
| C.I. Acid Black 24 | | | | | | | | | 4 | | | |
| C.I. Direct Yellow 132 | | 0.75 | | | | | | | | | | |
| C.I. Direct Yellow 86 | | 1 | | | | | | | | 2 | | |
| C.I. Acid Yellow 42 | | | | | | 1.75 | | | | | | |
| C.I. Acid Red 289 | | | 1 | | | | | | | | | |
| C.I. Acid Red 52 | | | 1 | | | | | | | | 2 | |
| C.I. Direct Red 184 | | | | | | | 1.75 | | | | | |
| C.I. Direct Blue 199 | | | | 3.5 | | | | | | | | |
| C.I. Direct Blue 86 | | | | | | | | 2.5 | | | | |
| C.I. Acid Blue 9 | | | | | | | | | | | | 3 |
| TEG-mBE | 10 | 10 | 10 | 10 | 10 | 10 | 10 | 10 | 10 | 10 | 10 | 10 |
| DEG-mBE | | | | | | | | | | | | |
| Surfynol 465 | 0.8 | 0.8 | 0.8 | 0.8 | 1 | 1 | 1 | 1 | 0.8 | 0.8 | 0.8 | 0.8 |
| Diethylene glycol | 5 | 5 | 5 | 5 | | | | | 3 | 10 | 1 | 2 |
| Glycerin | | | | | 5 | 5 | 5 | 5 | 3 | 2 | 6 | 7 |
| Proxel XL-2 | 0.3 | 0.3 | 0.3 | 0.3 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 | 0.005 | 0.005 | 0.005 | 0.005 |
| Ultrapure water | 78.895 | 82.145 | 81.895 | 80.395 | 79.695 | 81.945 | 81.954 | 81.195 | 78.895 | 74.895 | 79.895 | 76.895 |
| Surface tension [mN/m] | 30.4 | 31.4 | 31.1 | 30.0 | 30.1 | 30.8 | 30.7 | 29.6 | 30.3 | 31.3 | 31.0 | 29.9 |

| | Example C13 | | | | | Example C14 | | | |
|---|---|---|---|---|---|---|---|---|---|
| [wt %] | B | Y | M | C | [wt %] | B | Y | M | C |
| C.I. Direct Black 154 | 4 | | | | C.I. Direct Black 154 | 3 | | | |
| C.I. Direct Black 9 | | | | | C.I. Direct Black 9 | | | | |
| C.I. Acid Black 24 | | | | | C.I. Acid Black 24 | | | | |

TABLE 3-continued

| | | | | | | | | | | |
|---|---|---|---|---|---|---|---|---|---|---|
| C.I. Direct Yellow 132 | | 1.2 | | | C.I. Direct Yellow 132 | | | | | |
| C.I. Direct Yellow 86 | | 0.8 | | | C.I. Direct Yellow 86 | | 1 | | | |
| C.I. Acid Yellow 42 | | | | | C.I. Acid Yellow 42 | | | | | |
| C.I. Acid Red 289 | | | 0.4 | | C.I. Acid Red 289 | | | 1 | | |
| C.I. Acid Red 52 | | | 1.0 | | C.I. Acid Red 52 | | | | | |
| C.I. Direct Red 184 | | | | | C.I. Direct Red 184 | | | | | |
| C.I. Direct Blue 199 | | | | | C.I. Direct Blue 199 | | | | | |
| C.I. Direct Blue 86 | | | | | C.I. Direct Blue 86 | | | | 2.5 | |
| C.I. Acid Blue 9 | | | | 2 | C.I. Acid Blue 9 | | | | | |
| TEG-mBE | 10 | 10 | 10 | 10 | TEG-mBE | 12 | 12 | 12 | 12 | |
| DEG-mBE | | | | | DEG-mBE | | | | | |
| Surfynol 465 | 0.8 | 0.8 | 0.8 | 0.8 | Surfynol TG | 0.2 | 0.2 | 0.2 | 0.2 | |
| Diethylene glycol | 7 | 15 | 17 | 17 | Surfynol 82 | 1 | 1 | 1 | 1 | |
| Glycerin | | | | | Diethylene glycol | 6 | 10 | 10 | 8 | |
| Proxel XL-2 | 0.3 | 0.3 | 0.3 | 0.3 | Proxel XL-2 | 0.3 | 0.3 | 0.3 | 0.3 | |
| Benzotriazole | | | | | | | | | | |
| Ultrapure water | 77.9 | 71.9 | 70.5 | 69.9 | Ultrapure water | 75.5 | 75.5 | 75.5 | 76.5 | |
| Surface tension [mN/m] | | | | | Surface tension [mN/m] | 29.1 | 29.4 | 29.2 | 29.2 | |

TABLE 4

| [wt %] | Comparative Example C1 | | | | Comparative Example C2 | | | | Comparative Example C3 | | | |
|---|---|---|---|---|---|---|---|---|---|---|---|---|
| | B | Y | M | C | B | Y | M | C | B | Y | M | C |
| C.I. Direct Black | 154 | | | | | | | | 5 | | | |
| C.I. Direct Black 9 | | | | | 4 | | | | | | | |
| C.I. Acid Black 24 | 4 | | | | | | | | | | | |
| C.I. Direct Yellow 132 | | | | | | | | | | 2 | | |
| C.I. Direct Yellow 86 | | | | | | 1.75 | | | | | | |
| C.I. Acid Yellow 42 | | 2 | | | | | | | | | | |
| C.I. Acid Red 289 | | | | | | | | | | | 2 | |
| C.I. Acid Red 52 | | | | | | | 2 | | | | | |
| C.I. Direct Red 184 | | | 1.75 | | | | | | | | | |
| C.I. Direct Blue 199 | | | | | | | | | | | | 3.5 |
| C.I. Direct Blue 86 | | | | | | | | 3 | | | | |
| C.I. Acid Blue 9 | | | | 2.5 | | | | | | | | |
| TEG-mBE | 5 | 5 | 5 | 5 | 14 | 14 | 14 | 14 | 10 | 10 | 10 | 10 |
| DEG-mBE | | | | | | | | | | | | |
| Surfynol 465 | 0.5 | 0.5 | 0.5 | 0.5 | 1 | 1 | 1 | 1 | 0.3 | 0.3 | 0.3 | 0.3 |
| Diethylene glycol | | | | | 10 | 15 | 15 | 16 | 8 | 18 | 19 | 15 |
| Glycerin | 8 | 10 | 9 | 10 | | | | | | | | |
| Proxel XL-2 | 0.3 | 0.3 | 0.3 | 0.3 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 | 0.005 | 0.005 | 0.005 | 0.005 |
| Ultrapure water | 82.195 | 82.195 | 83.445 | 81.695 | 70.695 | 67.945 | 67.695 | 65.695 | 76.395 | 69.395 | 68.395 | 70.895 |
| Surface tension [mN/m] | 31.3 | 32.1 | 31.7 | 30.8 | 28.9 | 29.3 | 29.0 | 28.7 | 31.2 | 32.2 | 31.8 | 30.9 |

| [wt %] | Comparative Example C4 | | | | Comparative Example C5 | | | | Comparative Example C6 | | | |
|---|---|---|---|---|---|---|---|---|---|---|---|---|
| | B | Y | M | C | B | Y | M | C | B | Y | M | C |
| C.I. Direct Black | 154 | | | | 5 | | | | 5 | | | |
| C.I. Direct Black 9 | 4 | | | | | | | | | | | |
| C.I. Acid Black 24 | | | | | | | | | | | | |
| C.I. Direct Yellow 132 | | | | | | 0.75 | | | | | | |
| C.I. Direct Yellow 86 | | 1.75 | | | | 1 | | | | 2 | | |
| C.I. Acid Yellow 42 | | | | | | | | | | | | |
| C.I. Acid Red 289 | | | | | | | 1 | | | | 2 | |
| C.I. Acid Red 52 | | | 2 | | | | 1 | | | | | |
| C.I. Direct Red 184 | | | | | | | | | | | | |
| C.I. Direct Blue 199 | | | | | | | | 3.5 | | | | |
| C.I. Direct Blue 86 | | | | 3 | | | | | | | | 3 |
| C.I. Acid Blue 9 | | | | | | | | | | | | |
| TEG-mBE | 10 | 10 | 10 | 10 | 10 | 10 | 10 | 10 | | | | |
| DEG-mBE | | | | | | | | | 7 | 7 | 7 | 7 |
| Surfynol 465 | 1.4 | 1.7 | 1.5 | 1.3 | 0.8 | 0.8 | 0.8 | 0.8 | 0.8 | 0.8 | 0.8 | 0.8 |
| Diethylene glycol | 10 | 15 | 15 | 16 | | | | | 8 | 10 | 12 | 14 |
| Glycerin | | | | | | | | | | | | |
| Proxel XL-2 | 0.3 | 0.3 | 0.3 | 0.3 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 | 0.005 | 0.005 | 0.005 | 0.005 |
| Ultrapure water | 74.295 | 71.245 | 71.195 | 69.395 | 83.895 | 87.145 | 86.895 | 85.395 | 78.895 | 79.895 | 77.895 | 74.895 |
| Surface tension [mN/m] | 28.9 | 28.5 | 28.7 | 28.8 | 30.3 | 31.4 | 31.2 | 30.1 | 30.5 | 31.3 | 31.2 | 30.2 |

TABLE 4-continued

| [wt %] | Comparative Example C7 | | | | Comparative Example C8 | | | |
| --- | --- | --- | --- | --- | --- | --- | --- | --- |
| | B | Y | M | C | B | Y | M | C |
| C.I. Direct Black 154 | | | | | | | | |
| C.I. Direct Black 9 | 4 | | | | 4 | | | |
| C.I. Acid Black 24 | | | | | | | | |
| C.I. Direct Yellow 132 | | 2 | | | | 2 | | |
| C.I. Direct Yellow 86 | | | | | | | | |
| C.I. Acid Yellow 42 | | | | | | | | |
| C.I. Acid Red 289 | | | | | | | | |
| C.I. Acid Red 52 | | | 2 | | | | 2 | |
| C.I. Direct Red 184 | | | | | | | | |
| C.I. Direct Blue 199 | | | | 3 | | | | 3 |
| C.I. Direct Blue 86 | | | | | | | | |
| C.I. Acid Blue 9 | | | | | | | | |
| TEG-mBE | | | | | 8.5 | 8.5 | 8.5 | 8.5 |
| DEG-mBE | | | | | | | | |
| Surfynol 465 | 0.8 | 0.8 | 0.8 | 0.8 | | | | |
| Diethylene glycol | | | | | | | | |
| Glycerin | 5 | 12 | 10 | 11 | 5 | 12 | 10 | 11 |
| Proxel XL-2 | 0.3 | 0.3 | 0.3 | 0.3 | 0.3 | 0.3 | 0.3 | 0.3 |
| Benzotriazole | 0.005 | 0.005 | 0.005 | 0.005 | 0.005 | 0.005 | 0.005 | 0.005 |
| Ultrapure water | 89.895 | 84.895 | 86.895 | 84.895 | 82.195 | 77.195 | 79.195 | 77.195 |
| Surface tension [mN/m] | 32.0 | 33.0 | 32.9 | 31.9 | 33.7 | 34.0 | 34.3 | 33.6 |

Evaluation C

The above ink compositions were evaluated as follows.

Printing was carried out using an experimental 48-nozzle ink jet printer under conditions of a jetting nozzle diameter of 30 μm, a piezoelectric element drive voltage of 20 V, a drive frequency of 5.5 kHz, a resolution of 360 dots/inch and an amount of ink jetted of 0.05 μg/dot.

PPC paper (PPC paper manufactured by Xerox Corp. and RICOPY 6200 manufactured by Ricoh Co., Ltd.), regenerated paper (Yamayuri manufactured by Honshu Paper Co., Ltd.), bond paper (Gilbert Bond 25% cotton paper manufactured by Mead Corp.) and wood-free paper (OK wood-free paper L manufactured by Oji Paper Co., Ltd.) were used as the recording paper.

Evaluation C1: Quick drying

A 100%-duty printing of a single color was formed using each color ink composition. A 100%-duty printing of a combination of two ink compositions was further carried out by overprinting. After elapse of predetermined period of time from printing, paper of the same type as the recording paper used for printing was overlaid on the print with a pressure of 200 g/cm² to observe whether or not migration of ink occurred between the two sheets of paper.

The results were evaluated as follows. The results of evaluation were as given in Table 5.

No ink migration was observed even within less than 1 sec from printing for all prints—excellent (⊙);

No ink migration became not observed 1 to 2 sec after printing for all the prints—good (o);

No ink migration became not observed 2 to 5 sec after printing for all the prints—slightly poor (Δ); and Ink migration was observed even after elapse of 5 sec or longer from printing for any one of the prints—poor (X).

Evaluation C2: Quality of single-color print

Alphabets were printed using each color ink composition. Observation was made on the occurrence of bleeding and feathering of prints. The results were evaluated as follows. The results of evaluation were as given in Table 5.

Neither bleeding nor feathering was substantially observed—excellent (⊙);

Bleeding and/or feathering were somewhat observed in some types of paper—good o)

Bleeding and/or feathering were observed in some types of paper—slightly poor (Δ); and Bleeding and/or feathering were observed in all the types of paper—poor (X).

Evaluation C3: Quality of color mixing print

A 100%-duty printing of one color ink composition among four color ink compositions was formed. Then, a 100%-duty printing of other color ink composition was formed so as to contact with the 100%-duty printing previously formed. The boundary portion was observed with the naked eye. The results were evaluated as follows. The results of observation was as given in Table 5.

Neither bleeding nor feathering derived from color mixing was substantially observed in all the combinations—excellent (⊙);

Bleeding and/or feathering derived from color mixing were somewhat observed in some combinations—good (o);

Bleeding and/or feathering derived from color mixing were observed in some combinations depending upon types of paper—slightly poor (Δ); and Bleeding and/or feathering derived from color mixing were observed in all the types of paper—poor (X).

Evaluation C4: Jetting stability

Printing was continuously carried out using each color ink composition, and the time taken for dropout of dots and scattering of ink to be observed ten times in total was measured. The results were evaluated as follows. The results of evaluation were as given in Table 5.

Successful printing for 48 hr or longer for all the ink compositions—excellent (⊚);

Successful printing for 24 to 48 hr for any one of the color ink compositions—good (○);

Successful printing for 1 to 24 hr for any one of the color ink compositions—slightly poor (△); and Successful printing for shorter than 1 hr for any one of the color ink compositions—poor (X).

Evaluation C5: High-speed response

The jetting stability in a high-speed response was evaluated in the same manner as that of Evaluation C3, except that the drive frequency of the recording head was 10 kHz. The results were as given in Table 5.

The results were evaluated as follows. The results of evaluation were as given in Table 5.

Each member exhibited a weight change within 5% with substantially no change in appearance—excellent (⊚);

Each member exhibited a weight change within 10% with substantially no change in appearance—good (○);

Each member exhibited a weight change exceeding 10% with substantially no change in appearance—slightly poor (△); and Each member exhibited a weight change exceeding 10% and swelling and dissolution—poor (X).

TABLE 5

|  |  | Example |  |  |  |  |  |  |  |  |  |  |  | Comparative Example |  |  |  |  |  |  |  |
|---|---|---|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 1 | 2 | 3 | 4 | 5 | 6 | 7 | 8 |
| Evaluation C1 |  | ⊚ | ⊚ | ⊚ | ○ | ⊚ | ⊚ | ○ | ⊚ | ⊚ | ⊚ | ⊚ | ⊚ | △ | ⊚ | ⊚ | ⊚ | ⊚ | ○ | △ | △ |
| Evaluation C2 | B | ⊚ | ⊚ | ⊚ | ⊚ | ⊚ | ⊚ | ⊚ | ⊚ | ⊚ | ⊚ | ⊚ | ⊚ | △ | ⊚ | ○ | ⊚ | ⊚ | ○ | △ | △ |
|  | Y | ⊚ | ⊚ | ⊚ | ⊚ | ⊚ | ⊚ | ⊚ | ⊚ | ⊚ | ⊚ | ⊚ | ⊚ | △ | ⊚ | ○ | ⊚ | ⊚ | ○ | △ | △ |
|  | M | ⊚ | ⊚ | ⊚ | ⊚ | ⊚ | ⊚ | ⊚ | ⊚ | ⊚ | ⊚ | ⊚ | ⊚ | △ | ⊚ | ○ | ⊚ | ⊚ | ○ | △ | △ |
|  | C | ⊚ | ⊚ | ⊚ | ⊚ | ⊚ | ⊚ | ⊚ | ⊚ | ⊚ | ⊚ | ⊚ | ⊚ | △ | ⊚ | ○ | ⊚ | ⊚ | ○ | △ | △ |
| Evaluation C3 |  | ⊚ | ⊚ | ⊚ | ○ | ⊚ | ⊚ | ○ | ○ | ⊚ | ⊚ | ⊚ | ⊚ | X | ⊚ | △ | ⊚ | ⊚ | ○ | X | X |
| Evaluation C4 | B | ⊚ | ⊚ | ⊚ | ⊚ | ⊚ | ⊚ | ⊚ | ⊚ | ⊚ | ⊚ | ⊚ | ⊚ | △ | X | X | X | △ | ○ | X | X |
|  | Y | ⊚ | ⊚ | ⊚ | ⊚ | ⊚ | ⊚ | ⊚ | ⊚ | ⊚ | ⊚ | ⊚ | ⊚ | △ | △ | X | X | △ | ○ | X | X |
|  | M | ⊚ | ⊚ | ⊚ | ⊚ | ⊚ | ⊚ | ⊚ | ⊚ | ⊚ | ⊚ | ⊚ | ⊚ | △ | △ | X | X | △ | ○ | X | X |
|  | C | ⊚ | ⊚ | ⊚ | ⊚ | ⊚ | ⊚ | ⊚ | ⊚ | ⊚ | ⊚ | ⊚ | ⊚ | △ | △ | X | X | △ | ○ | X | X |
| Evaluation C5 | B | ⊚ | ○ | ○ | ○ | ⊚ | ○ | ○ | ⊚ | ○ | ○ | ○ | ⊚ | △ | X | X | X | X | △ | X | X |
|  | Y | ⊚ | ⊚ | ○ | ○ | ⊚ | ⊚ | ○ | ⊚ | ⊚ | ○ | ○ | ⊚ | △ | △ | X | X | X | △ | X | X |
|  | M | ⊚ | ⊚ | ○ | ○ | ⊚ | ⊚ | ○ | ⊚ | ⊚ | ○ | ○ | ⊚ | △ | △ | X | X | X | △ | X | X |
|  | C | ⊚ | ⊚ | ○ | ○ | ⊚ | ⊚ | ○ | ⊚ | ○ | ○ | ○ | ⊚ | △ | X | X | X | X | △ | X | X |
| Evaluation C6 | B | ⊚ | ⊚ | ⊚ | ⊚ | ⊚ | ⊚ | ⊚ | ⊚ | ⊚ | ⊚ | ⊚ | ⊚ | X | △ | X | X | ○ | X | X | △ |
|  | Y | ⊚ | ⊚ | ⊚ | ⊚ | ⊚ | ⊚ | ⊚ | ⊚ | ⊚ | ⊚ | ⊚ | ⊚ | X | ○ | X | X | ○ | X | X | ○ |
|  | M | ⊚ | ⊚ | ⊚ | ⊚ | ⊚ | ⊚ | ⊚ | ⊚ | ⊚ | ⊚ | ⊚ | ⊚ | X | ○ | X | X | ○ | X | X | ○ |
|  | C | ⊚ | ⊚ | ⊚ | ⊚ | ⊚ | ⊚ | ⊚ | ⊚ | ⊚ | ⊚ | ⊚ | ⊚ | X | △ | X | X | ○ | X | X | ○ |
| Evaluation C7 |  | ⊚ | ○ | ○ | ⊚ | ⊚ | ⊚ | ⊚ | ⊚ | ⊚ | ○ | ○ | ○ | ⊚ | X | ○ | ○ | X | X | ⊚ | ○ |

Evaluation C6: Intermittent jetting stability

Printing of a line was performed using each color ink composition under the condition of 25° C. and 20% humidity, suspended for a predetermined period and the resumed. Observation was made on the occurrence of dropout or deviation from ink path of the first dot when the printing was resumed. The suspending period by the time when dropout or deviation from ink path was observed was evaluated as follows. The results of evaluation were as given in Table 5.

Over 60 seconds—excellent (1)

50 to 60 seconds—excellent (2)

30 to 40 seconds—excellent (3)

20 to 10 seconds—good (○)

5 to 10 seconds—slightly poor (△)

less then 5 seconds—poor (X).

Evaluation C7: Corrosion of member by ink composition

Head members and members for feeding and discharging (specifically, ABS, AS, PS, PP, PSF, PC, PE, PET, PBT, nylon, ACS, POM, butyl rubber, silicone rubber, fluoro rubber, and EPDM rubber), which are likely to contact with the ink, were immersed in each color ink and allowed to stand at 25° C. for 3 months. Then, a change in weight and appearance were observed.

Example D

Dyes in Table 6 and other ingredients specified were mixed together to provide ink compositions and the combination thereof as Examples D1 to D4 and Comparative Examples D1 to D5.

Examples D1 to D4 and Comparative Examples D1 to D5

| Dye | Amount specified in Table 6 |
|---|---|
| Glycerin | 5% |
| Diethylene glycol | 10% |
| Surfynol 465 | 1% |
| Pure water | Balance |

Examples D5 and D6

| Dye | Amount specified in Table 6 |
|---|---|
| Triethylene glycol monobutyl ether | 17% |
| Diethylene glycol | 10% |
| Surfynol 465 | 0.8% |
| Pure water | Balance |

TABLE 6

| | Yellow Ink | | Magenta Ink | | Cyan Ink |
|---|---|---|---|---|---|
| | D.Y. 86 | D.Y. 132 | A.R. 52 | A.R. 285 | D.B. 199 |
| Example | | | | | |
| 1 | 0.3 | 0.9 | 0.3 | 0.6 | 1 |
| 2 | 1 | 2 | 1 | 2 | 3 |
| 3 | 1 | 1 | 1 | 1 | 2 |
| 4 | 2 | 3 | 2.5 | 1.3 | 4 |
| 5 | 3 | 1 | 0.9 | 0.6 | 2.5 |
| 6 | 0.5 | 0.5 | 0.9 | 0.7 | 1.5 |
| 7 | 1 | 0.75 | 1.2 | 0.8 | 3.5 |
| 8 | 0.5 | 0.75 | 0.7 | 0.7 | 2.5 |
| Comparative Example | | | | | |
| 1 | 1 | 1 | 1 | 1 | 5 |
| 2 | 1 | 1 | 2 | — | 2 |
| 3 | 1 | 1 | — | 2 | 2 |
| 4 | 1 | — | 1 | 1 | 2 |
| 5 | — | 2 | 1 | 1 | 2 |

Evaluation D

These ink compositions were evaluated as follows.

(1) Evaluating printer

An ink jet printing printer provided with an ink jet printing head having 48 nozzles, which printer permits printing under conditions of a jetting nozzle diameter of 30 μm, a piezoelectric element drive voltage of 25 V, a drive frequency of 5 kHz, a resolution of 360 dots/inch and an amount of ink jetted of 0.05 μg/dot.

(2) Recording paper used for evaluation

Xerox-R (manufactured by Fuji Xerox Co., Ltd.)

Neenah bond (25% cotton fiber manufactured by Neenah bond)

Canon Dry (Canon Sales Co., Ltd.)

EPP (Epson Hanbai Corp.)

Xerox 4024 3R721 (manufactured by Xerox Corp.)

(3) Evaluation method A 100%-duty printing of red, green and blue was carried out using combinations of ink compositions of the Examples and Comparative Examples. Specifically, 100%-duty printing of red was carried out by overprinting the yellow ink and the magenta ink, sold printing of green was carried out by overprinting the yellow ink and the cyan ink, and solid printing of blue was carried out by overprinting the magenta ink and the cyan ink.

In order to evaluate the color tones with respect to the 100%-duty print image (3×3 cm), the L*a*b* color specification system in the color difference indication method specified in CIE (Commission International de l'Eclairage) was measured with a Macbeth CE-7000 spectrophotometer (manufactured by Macbeth), and the color difference between the measured value and the color tone standard value of ISO 2845-1975 given in Table 7 was determined by the following equation (I).

TABLE 7

| | L* | a* | b* |
|---|---|---|---|
| Red | 47.4 | 70.3 | 47.5 |
| Green | 47.6 | −74.1 | 23.2 |
| Blue | 19.2 | 35.5 | −53.0 |

$$\Delta E^*ab = [(\Delta L^*)^2 + (\Delta a^*)^2 + (\Delta b^*)^2]^{1/2} \quad (I)$$

The color differences were as given in Table 8. In the table, the color difference E*ab was evaluated based on the following criteria.

Color difference E*ab for the three colors:

20 or less for all the colors—excellent (⊚);

More than 20 to 30 for any one of the colors—good (o);

More than 30 for any one of the colors—poor (X).

TABLE 8

| | ΔE*ab | | | |
|---|---|---|---|---|
| | Red | Green | Blue | Evaluation |
| Example | | | | |
| 1 | 21.0 | 17.5 | 26.5 | o |
| 2 | 23.2 | 19.1 | 18.6 | o |
| 3 | 18.8 | 19.7 | 19.3 | ⊚ |
| 4 | 24.7 | 25.8 | 28.7 | o |
| 5 | 18.0 | 16.2 | 13.0 | ⊚ |
| 6 | 15.2 | 17.6 | 12.4 | ⊚ |
| 7 | 19.4 | 14.4 | 16.7 | ⊚ |
| 8 | 18.1 | 19.2 | 17.1 | ⊚ |
| Comparative Example | | | | |
| 1 | 18.8 | 45.0 | 33.8 | X |
| 2 | 41.2 | 19.7 | 39.3 | X |
| 3 | 42.3 | 19.7 | 38.8 | X |
| 4 | 45.1 | 32.5 | 19.3 | X |
| 5 | 40.9 | 36.3 | 19.3 | X |

What is claimed is:

1. A yellow ink composition comprising C.I. Direct Yellow 86 and C.I. Direct yellow 132 in a weight ratio of 1:3 to 3:1 and each in an amount of 0.3 to 3.0% by weight based on the ink composition.

2. A magenta ink composition comprising C.I. Acid Red 52 and C.I. Acid Red 289 in a weight ratio of 1:2 to 2:1 and each in an amount of 0.3 to 2.5 % by weight based on the ink composition.

3. An ink composition for ink jet printing, comprising water, a dye, a hydrophilic, high-boiling and low-volatile solvent, a polyhydric alcohol lower alkyl ether and an acetylene glycol represented by the following formula (I):

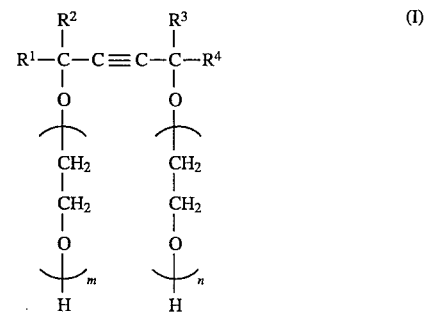

wherein $R^1$, $R^2$, $R^3$ and $R^4$ each independently represent a $C_{1-6}$ alkyl group and n+m is 0 to 30, the contents of the polyhydric alcohol lower alkyl ether and the acetylene glycol represented by the formula (I) being 7 to 12% by weight and 0.5 to 1.2% by weight, respectively.

4. An ink composition according to claim 3, wherein the polyhydric alcohol lower alkyl ether and the acetylene glycol represented by the formula (I) are contained in respective amounts of 7 to 10% by weight and 0.5 to 1% by weight.

5. An ink composition according to claim 3, wherein the polyhydric alcohol lower alkyl ether is triethylene glycol monobutyl ether and the acetylene glycol is represented by the formula (I) where $R^1$ and $R^4$ are isobutyl, $R^2$ and $R^3$ are a methyl group and m+n is about 10.

6. The ink composition according to claim 3, wherein the amount of the hydrophilic, high-boiling and low-volatile solvent added is 50% by weight or more based on the polyhydric alcohol lower alkyl ether.

7. The ink composition according to claim 3, which further comprises 0.001 to 1.0% by weight of benzotriazole.

8. The ink composition according to claim 7, wherein the amount of benzotriazole added is in the range of from 0.005 to 0.5% by weight.

9. The ink composition according to claim 3, which has a surface tension of not less than 29 mN/m.

10. The ink composition according to claim 3, wherein the dye comprises C.I. Direct Yellow 86 and C.I. Direct Yellow 132 in a weight ratio of 1:3 to 3:1 and each in an amount of 0.3 to 3.0% by weight based on the ink composition.

11. The ink composition according to claim 3, wherein the dye comprises C.I. Acid Red 52 and C.I. Acid Red 289 in a weight ratio of 1:2 to 2:1 and each in an amount of 0.3 to 2.5% by weight based on the ink composition.

12. The ink composition according to claim 3, wherein the dye comprised 1 to 4% by weight of one or more dyes selected from a group consisting of C.I. Direct Blue 199, C.I. Direct Blue 86 and C.I. Acid Blue 9.

13. In combination, a yellow ink composition comprising C.I. Direct Yellow 86 and C.I. Direct Yellow 132 in a weight ratio of 1:3 to 3:1 and each in an amount of 0.3 to 3.0% by weight based on the yellow ink composition, a magenta ink composition comprising C.I. Acid Red 52 and C.I. Acid Red 289 in a weight ratio of 1:2 to 2:1 and each in an amount of 0.3 to 2.5% by weight based on the magenta ink composition, and a cyan ink composition comprising 1 to 4% by weight of one or more dyes selected from the group consisting of C.I. Direct Blue 199, C.I. Direct Blue 86 and C.I. Acid Blue 9.

14. An ink cartridge comprising a yellow ink composition comprising C.I. Direct Yellow 86 and C.I. Direct Yellow 132 in a weight ratio of 1:3 to 3:1 and each in an amount of 0.3 to 3.0% by weight based on the yellow ink composition, a magenta ink composition comprising C.I. Acid Red 52 and C.I. Acid Red 289 in a weight ratio of 1:2 to 2:1 and each in an amount of 0.3 to 2.5% by weight based on the magenta ink composition, and a cyan ink composition comprising 1 to 4% by weight of one or more dyes selected from a group consisting of C.I. Direct Blue 199, C.I. Direct Blue 86 and C.I. Acid Blue 9, wherein the ink compositions are contained in separated spaces in the cartridge, respectively.

15. In combination, a yellow ink composition comprising C.I. Direct Yellow 86 and C.I. Direct Yellow 132 in a weight ratio of 1:3 to 3:1 and each in an amount of 0.3 to 3.0% by weight based on the yellow ink composition, a magenta ink composition comprising C.I. Acid Red 52 and C.I. Acid Red 289 in a weight ratio of 1:2 to 2:1 and each in an amount of 0.3 to 2.5% by weight based on the magenta ink composition, and a cyan ink composition comprising 1 to 4% by weight of one or more dyes selected from the group consisting of C.I. Direct Blue 199, C.I. Direct Blue 86 and C.I. Acid Blue 9.

16. An ink cartridge comprising a yellow ink composition comprising C.I. Direct Yellow 86 and C.I. Direct Yellow 132 in a weight ratio of 1:3 to 3:1 and each in an amount of 0.3 to 3.0% by weight based on the ink yellow composition, a magenta ink composition comprising C.I. Acid Red 52 and C.I. Acid Red 289 in a weight ratio of 1:2 to 2:1 and each in an amount of 0.3 to 2.5% by weight based on the ink composition, and a cyan ink composition comprising 1 to 4 % by weight of one or more dyes selected from the group consisting of C.I. Direct Blue 199, C.I. Direct Blue 86 and C.I. Acid Blue 9, wherein the ink compositions are contained in separated spaces in the cartridge, respectively.

17. A color ink jet printing method comprising the step of ejecting an ink composition on a recording medium to form an ink image, wherein the ink composition comprises a yellow ink composition, a magenta ink composition and a cyan ink composition, the yellow ink composition comprising C.I. Direct Yellow 86 and C.I. Direct Yellow 132 in a weight ratio of 1:3 to 3:1 and each in an amount of 0.3 to 3.0% by weight based on the ink composition, and the magenta ink composition comprising C.I. Acid Red 52 and C.I. Acid Red 289 in a weight ratio of 1:2 to 2:1 and each in an amount of 0.3 to 2.5% by weight based on the magenta ink composition.

18. A color ink jet printing method comprising the step of ejecting an ink composition on a recording medium to form an ink image, wherein the ink composition comprises a yellow ink composition, a magenta ink composition and a cyan ink composition, wherein the yellow ink composition comprises C.I. Direct Yellow 86 and C.I. Direct Yellow 132 in a weight ratio of 1:3 to 3:1 and each in an amount of 0.3 to 3.0% by weight based on the yellow ink composition, the magenta ink composition comprises C.I. Acid Red 52 and C.I. Acid Red 289 in a weight ratio of 1:2 to 2:1 and each in an amount of 0.3 to 2.5% by weight based on the magenta ink composition.

19. The method according to claim 18, wherein the cyan ink composition comprises 1 to 4% by weight of one or more dyes selected from a group consisting of C.I. Direct Blue 199, C.I. Direct Blue 86 and C.I. Acid Blue 9.

20. An ink jet printing method comprising jetting droplets of an ink composition according to claim 7 through a nozzle of a recording head, wherein the ink composition is fed from an ink vessel to the recording head, an ink absorber is placed in the ink vessel so as to impregnate and hold the ink composition therewith in the ink vessel, and the nozzle in the recording head is a nozzle which has been subjected to a water-repellent treatment.

21. The method according to claim 20, wherein the ink absorber is a urethane foam.

22. The method according to claim 20, wherein the water-repellent treatment is an eutectoid plating using a nickel-fluoropolymer.

23. The method according to claim 17, wherein the cyan ink composition comprises 1 to 4% by weight of one or more dyes selected from the group consisting of C.I. Direct Blue 199, C.I. Direct Blue 86 and C.I. Acid Blue 9, said ink composition further comprising water, a hydrophilic, high-boiling and low-volatile solvent, a polyhydric alcohol lower alkyl ether and an acetylene glycol represented by the following formula (I):

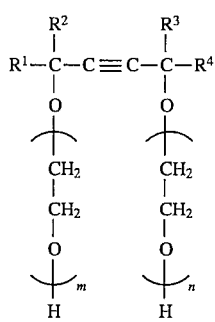

(I)

wherein $R^1$, $R^2$, $R^3$, and $R^4$, each independently represents a $C_{1-6}$ alkyl group and n+m is 0 to 30, the contents of the polyhydric alcohol lower alkyl ether and the acetylene glycol represented by the formula (I) being 7 to 12% by weight and 0.5 to 1.2% by weight, respectively.

24. The method according to claim 23, wherein any two of the yellow ink composition, the magenta ink composition and the cyan ink composition are overprinted to form red, green and blue for color printing.

25. The method according to claim 23, wherein acid paper is used as recording paper.

26. The method according to claim 18, wherein the cyan ink composition comprises 1 to 4% by weight of one or more dyes selected from a group consisting of C.I. Direct Blue 199, C.I. Direct Blue 86 and C.I. Acid Blue 9, said ink composition further comprising water, a hydrophilic, high-boiling and low-volatile solvent, a polyhydric alcohol lower alkyl ether and an acetylene glycol represented by the following formula (I):

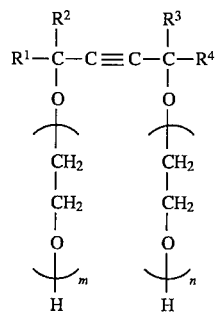

(I)

wherein $R^1$, $R^2$, $R^3$, and $R^4$, each independently represents a $C_{1-6}$ alkyl group and n+m is 0 to 30, the contents of the polyhydric alcohol lower alkyl ether and the acetylene glycol represented by the formula (I) being 7 to 12% by weight and 0.5 to 1.2% by weight, respectively.

* * * * *